US006142849A

United States Patent [19]

Horton et al.

[11] Patent Number: 6,142,849

[45] **Date of Patent: *Nov. 7, 2000**

[54] MUSICAL TOY

[75] Inventors: Gregory Horton, Manville; Robert Winslow, Newport, both of R.I.; Timothy R. Lightbody, Holliston, Mass.

[73] Assignee: Hasbro, Inc., Pawtucket, R.I.

[ * ] Notice: This patent is subject to a terminal disclaimer.

[21] Appl. No.: 09/011,087

[22] PCT Filed: Jun. 2, 1997

[86] PCT No.: PCT/US97/09481

§ 371 Date: Jan. 30, 1998

§ 102(e) Date: Jan. 30, 1998

[87] PCT Pub. No.: WO97/46997

PCT Pub. Date: Dec. 11, 1997

Related U.S. Application Data

[63] Continuation-in-part of application No. 08/658,360, Jun. 5, 1996, Pat. No. 5,668,333.

[51] Int. Cl.[7] .................... G09B 15/00

[52] U.S. Cl. .................... 446/175; 496/297; 84/470 R

[58] Field of Search .................... 446/175, 297; 84/679, 694, 470 R, 600, 601, 602, 477 R, 94.2, 95.2

[56] References Cited

U.S. PATENT DOCUMENTS 4,429,607 2/1984 Meno .................... 84/679

*Primary Examiner*—Sam Rimell

*Attorney, Agent, or Firm*—Marshall, O'Toole, Gerstein, Murray & Borun

[57] ABSTRACT

A musical toy shaped like a rainbow or a banjo which generates musical sounds in response to interruption of one or more radiation beams is disclosed. In one embodiment, the musical toy is provided with a frame member (202) having a substantially unobstructed aperture (206) disposed therein, a photoemitter (212) for generating a radiation beam across the aperture (206), a photodetector (216) positioned to receive the radiation beam, an audio generator for generating a plurality of temporally successive portions of a predetermined musical song, and a play mechanism for causing the audio generator to generate one of the temporally successive musical song portions in response to each interruption of the radiation beam so that repeated interruption of the radiation beam causes the predetermined musical song to be played. In a second embodiment, the musical toy has a base member (12), a second member (14) connected to the base member (12) so as to form a substantially unobstructed space (15) therebetween, a plurality of photoemitters (22) for generating radiation beams between the base member (12) and the second member (14), a plurality of photodetectors (20) each positioned to receive a respective one of the radiation beams, an audio generator for generating a plurality of musical sounds each of which is associated with a respective one of the radiation beams, and a mechanism for causing the audio generator to generate one of the musical sounds in response to an interruption of the radiation beam associated with the one musical sound.

19 Claims, 9 Drawing Sheets

MUSICAL TOY

This is the U.S. national phase of International Application No. PCT/US97/09481, which is a continuation-in-part of U.S. Ser. No. 08/658,360 filed Jun. 5, 1996, now U.S. Pat. No. 5,668,333.

BACKGROUND OF THE INVENTION

The present invention relates to a musical toy which allows a child to play songs by interrupting one or more radiation beams generated by the toy.

Electronic musical instruments have been designed to allow a user to play individual musical notes during a song automatically played by the instrument, or to play individual musical notes separately. One example of such a musical instrument is the Casio Model ML-1, which is basically an electronic keyboard that simulates a piano. In addition to the piano-like keys of the keyboard, the Casio product has five tone buttons which allow a user to select any of twenty-five different musical instruments which can be electronically emulated, depending on what combination of the tone buttons are pressed by the user. For example, if the user selects the combination of tone buttons corresponding to a violin, each time one of the keyboard keys is pressed, the musical note generated by the Casio product will sound like, or emulate, a musical note of a violin.

The Casio product has a number of different operating modes. In a first operating mode referred to as a "play" mode, the Casio product simply plays the musical notes corresponding to the keys of the keyboard pressed by the user. In a second operating mode referred to as a "demo" mode, the Casio product automatically plays one of a number of various songs, as selected by the user, and also simultaneously plays musical notes corresponding to the keys of the keyboard pressed by the user.

Each of the white keys of the Casio product keyboard has an internal light which may be selectively turned on to illuminate the key. In a third operating mode referred to as an "any-key play" mode, the Casio product causes the keys to be illuminated, one at a time, in a particular order which corresponds to a song selected by the user. When the user depresses an illuminated key, the Casio product plays the corresponding musical note, and then illuminates the key corresponding to the next musical note in the song. Thus, by successively depressing the illuminated keys, the user plays the selected song.

U.S. Pat. No. 4,968,877 to McAvinney, et al. discloses another example of an electronic musical instrument in the form of an electronic harp. The McAvinney, et al. harp utilizes a neon tube disposed at one end of the harp to generate radiation towards the other end of the harp. The radiation is reflected from the other end of the harp towards an array of radiation detectors disposed between the two ends of the harp. The optical scanning device of the McAvinney, et al. harp senses and tracks the movement of the user's fingers and generates sound in response thereto.

SUMMARY OF THE INVENTION

In one aspect, the invention is directed to a musical toy having a frame member with a substantially unobstructed aperture disposed therein, the aperture having a size large enough to allow a child's hand to be disposed therein, a photoemitter for generating a radiation beam across the aperture, a photodetector positioned to receive the radiation beam, audio generation means for generating a plurality of temporally successive portions of a predetermined musical song, and play means for causing the audio generation means to generate one of the temporally successive musical song portions in response to each interruption of the radiation beam so that repeated interruption of the radiation beam causes the predetermined musical song to be played.

The frame member may have a first portion in which the aperture is formed and a second substantially linear portion, so that the frame member has an overall shape in the form of a portable stringed musical instrument, such as a banjo. The audio generation means may include means for generating a plurality of temporally successive portions of each of a plurality of predetermined musical songs, the musical toy may include a musical song selector for selecting one of the predetermined musical songs, and the play means may include means for causing the audio generation means to generate the temporally successive musical song portions of the one predetermined musical song in response to each interruption of the radiation beam so that repeated interruption of the radiation beam causes the one predetermined musical song to be played.

The audio generation means may include means for generating a first version of a predetermined musical song that is played in accordance with a first musical instrument and a second version of the predetermined musical song that is played in accordance with a second musical instrument different than the first musical instrument. In that case, the musical toy may also include a musical instrument selector for selecting one of the versions of the predetermined musical song, and the play means may include means for causing the audio generation means to generate temporally successive musical song portions of the one version of the predetermined musical song in response to interruption of the radiation beam to cause the one version of the predetermined musical song to be played.

In a second aspect, the invention is directed to a musical toy having a base member, a second member connected to the base member so as to form a substantially unobstructed space therebetween, means for generating a plurality of radiation beams between the base member and the second member, a plurality of photodetectors each positioned to receive a respective one of the radiation beams, audio generation means for generating a plurality of musical sounds each of which is associated with a respective one of the radiation beams, and means for causing the audio generation means to generate one of the musical sounds in response to an interruption of the radiation beam associated with the one musical sound.

The base member of the musical toy in accordance with the second aspect may be disposed in a generally horizontal plane, and the second member may be a semi-circular shaped rainbow member disposed in a generally vertical plane.

The musical toy in accordance with the second aspect may include audio generation means that is operable in a first mode in which one of a plurality of musical songs is generated and a second mode in which musical sounds are generated in response to interruption of the radiation beams, the musical toy additionally having a switch for selecting the first or second mode of operation.

The audio generation means may include means for generating a plurality of different musical songs, and the musical toy may also include a plurality of musical song designators each of which is associated with a different one of the radiation beams and which designates a respective one of the musical songs and means for causing the audio generation means to generate one of the musical songs in response to an interruption of the radiation beam associated with the musical song designator that designates the one musical song.

These and other features of the present invention will be apparent to those of ordinary skill in the art in view of the detailed description of the preferred embodiment, which is made with reference to the drawings, a brief description of which is provided below.

DETAILED DESCRIPTION OF THE PREFERRED EMBODIMENTS

Figure 1:
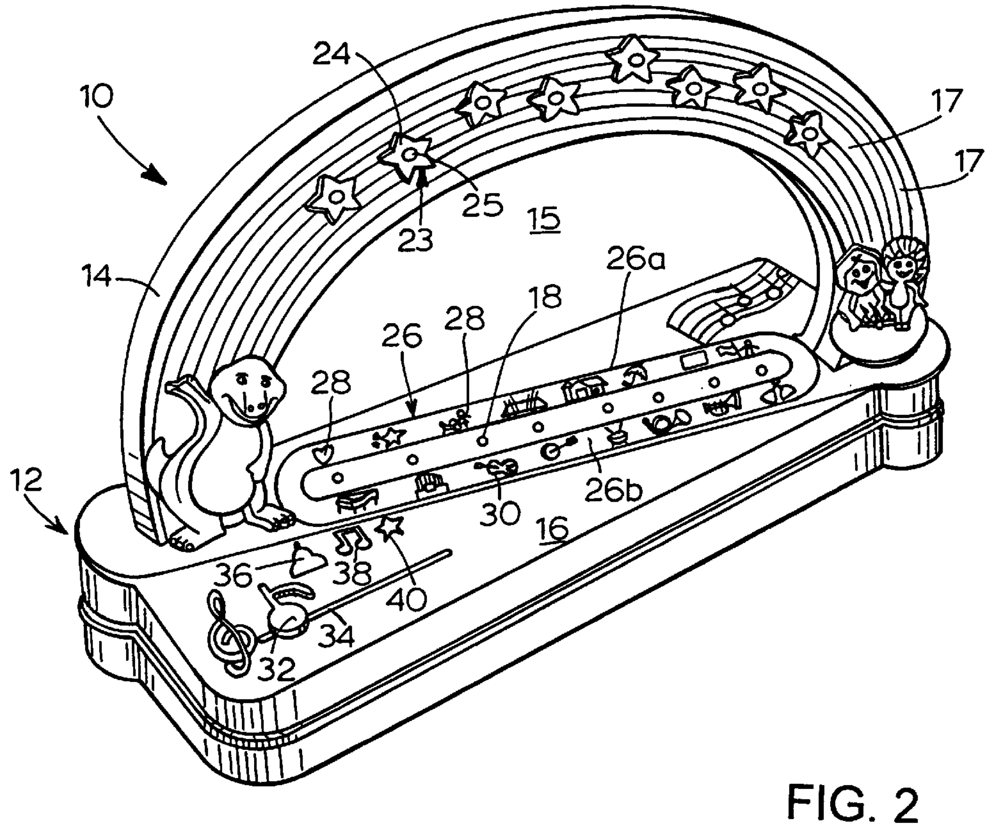
FIG. 1 is a perspective view of a first embodiment of a musical toy in accordance with the invention.

A first embodiment of a musical toy 10 in accordance with the invention is shown in FIG. 1. The musical toy 10 is composed of a base member 12 disposed in a generally horizontal position and a semi-circular shaped rainbow member 14 disposed in a generally vertical direction. The base member 12 and the rainbow member 14 may be formed of any suitable material, such as injection-molded plastic. A substantially unobstructed, semi-circular space 15 is formed between the base member 12 and the rainbow member 14. The rainbow member 14 may be provided with a number of different colored semi-circular stripes 17 to emulate a rainbow.

The base member 12 has an upper surface 16 with eight cylindrical holes 18 formed therein. A plurality of photodetectors 20 (FIG. 3) are disposed in the base member 12, each photodetector 20 being positioned directly below a respective one of the holes 18. A plurality of photoemitters 22 (FIG. 3) are disposed in the rainbow member 14, each photoemitter 22 being positioned directly above one of the holes 18 in the base member 12. The holes 18 may be covered with a piece of clear, colorless plastic (not shown) to prevent small objects or particulate matter from falling into the holes 18 and blocking them.

When the toy 10 is turned on, each photoemitter 22 generates a beam of radiation, which is not visible when the musical toy 10 is played, in a downward direction towards a respective one of the holes 18. Since each of the radiation beams is capable of being detected by its corresponding photodetector 20, the photodetectors 20 are capable of detecting when one of the radiation beams is blocked or interrupted, such as by passing a finger or object between the photoemitter 22 which generated the beam and the photodetector 20 which detects the beam.

The photoemitters 22 may be conventional light-emitting diodes (LEDs), and the photodetectors 20 may be conventional phototransistors. As used herein, the term "photoemitter" refers to any device for generating any type of radiation beam, either visible or invisible, that is capable of being detected. As used herein, the term "photodetector" refers to any device that is capable of detecting the presence or absence of any kind of radiation beam. It should be appreciated that, even if a photoemitter that generates visible light (e.g. a red LED) is used, the radiation beam generated by the photoemitter will generally not be visible when used in a lighted environment.

Instead of utilizing multiple photoemitters, a single photoemitter could be used with a plurality of photodetectors, in which case a radiation beam would be generated along the path between each photodetector and a point on the photoemitter.

When the musical toy 10 is turned on, the photoemitters 22 generate eight vertical, substantially parallel radiation beams which may be temporarily blocked or interrupted by the child playing with the toy 10. Each radiation beam is associated with a unique one of eight musical sounds or notes, and by selectively blocking the radiation beams, the child may play individual musical notes or different songs via a loudspeaker 19 (FIG. 3) disposed in the interior of the base member 12. The duration for which the musical sounds or notes are played may correspond to the length of time that the radiation beams are interrupted.

The rainbow member 14 is provided with a plurality of lights 23, each of which is positioned adjacent and associated with one of the radiation beams. Each light 23 is composed of a clear, colorless plastic star 24 which covers an LED 25. When the radiation beam associated with one of the LEDs 25 is interrupted, that LED 25 is illuminated.

Depending on the mode of operation of the musical toy 10, as described below, the interruption of the radiation beam may simultaneously cause a musical sound or note to be played and one of the star lights 23 to be illuminated, or the star lights 23 may be selectively illuminated to signal or prompt the child to interrupt the particular radiation beam associated with the illuminated light 23. Each of the LEDs 25 may generate light of a unique color to provide a visually pleasing effect.

Figure 2:
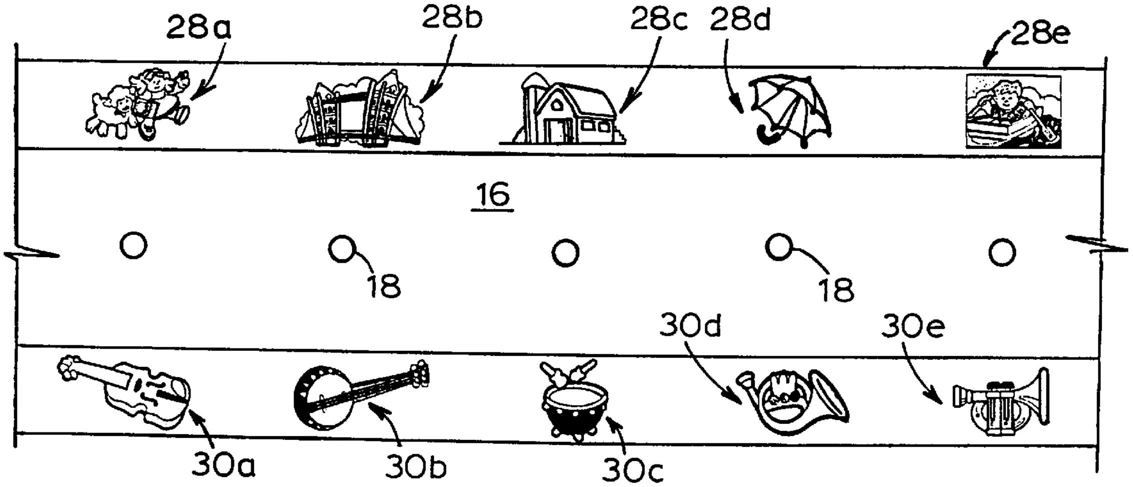
FIG. 2 is a top view of a portion of the base member of the musical toy of FIG. 1.

Referring to FIGS. 1 and 2, the upper surface 16 of the base member 12 has an oval-shaped decal 26 disposed thereon. The decal 26 has a first half **26*a* on which eight musical song designators 28 are printed and a second half 26*b* on which eight musical instrument designators 30 are printed. Each of the song designators 28** comprises a visual image representing a particular song.

For example, as shown in FIG. 2, the song designators 28 may include a visual image **28*a* of a girl and a lamb (which represents the song "Mary had a Little Lamb"), a visual image 28*b* of a bridge ("London Bridges Falling Down"), a visual image 28*c* of a barn ("Farmer in the Dell"), a visual image 28*d* of an umbrella, and a visual image 28*e*** of a child in a rowboat.

Each of the musical instrument designators 30 comprises a visual image of a different musical instrument, such as a visual image **30*a* of a violin, a visual image 30*b* of a banjo, a visual image 30*c* of a drum, a visual image 30*d* of a French horn, and a visual image 30*e* of a trumpet. Each of the song designators 28 and musical instrument designators 30 is positioned adjacent one of the holes 18 in the base member 12**, and thus adjacent one of the radiation beams.

A mode-select switch 32 is positioned within a slot 34 in the upper surface 16 of the base member 12. The mode-select switch 32 is movable to one of three positions, with each position corresponding to one of three operating modes. The three possible positions of the mode-select switch 32 are identified by a number of unique mode designators, including a designator 36 in the shape of a bell, a designator 38 in the shape of a musical note, and a designator 40 in the shape of a star. Alternatively, the mode-select switch 32 could be provided as three separate pushbuttons located on the upper surface of the base member 12.

As described in more detail below, when the mode-select switch 32 is positioned adjacent the bell designator 36, the musical toy 10 operates in its first mode in which, each time one of the radiation beams is interrupted by the child, the toy 10 plays the musical note associated with the interrupted radiation beam. When the mode-select switch 32 is positioned adjacent the musical note designator 38, the musical toy 10 operates in its second mode in which the musical toy 10 automatically plays one of a number of various songs, as selected by the child, and also simultaneously plays musical notes corresponding to the radiation beams interrupted by the child.

When the mode-select switch 32 is positioned adjacent the star designator 40, the musical toy 10 operates in its third mode in which the musical toy 10 illuminates the star lights 23 on the rainbow member 14, one at a time, in a particular order which corresponds to a song selected by the child. When the child interrupts the radiation beam corresponding to the illuminated light 23, the musical toy 10 plays the corresponding musical note, and then illuminates the star light 23 corresponding to the next musical note in the song. Thus, by successively interrupting the radiation beams associated with the illuminated lights, the child plays the selected song.

Figure 3:
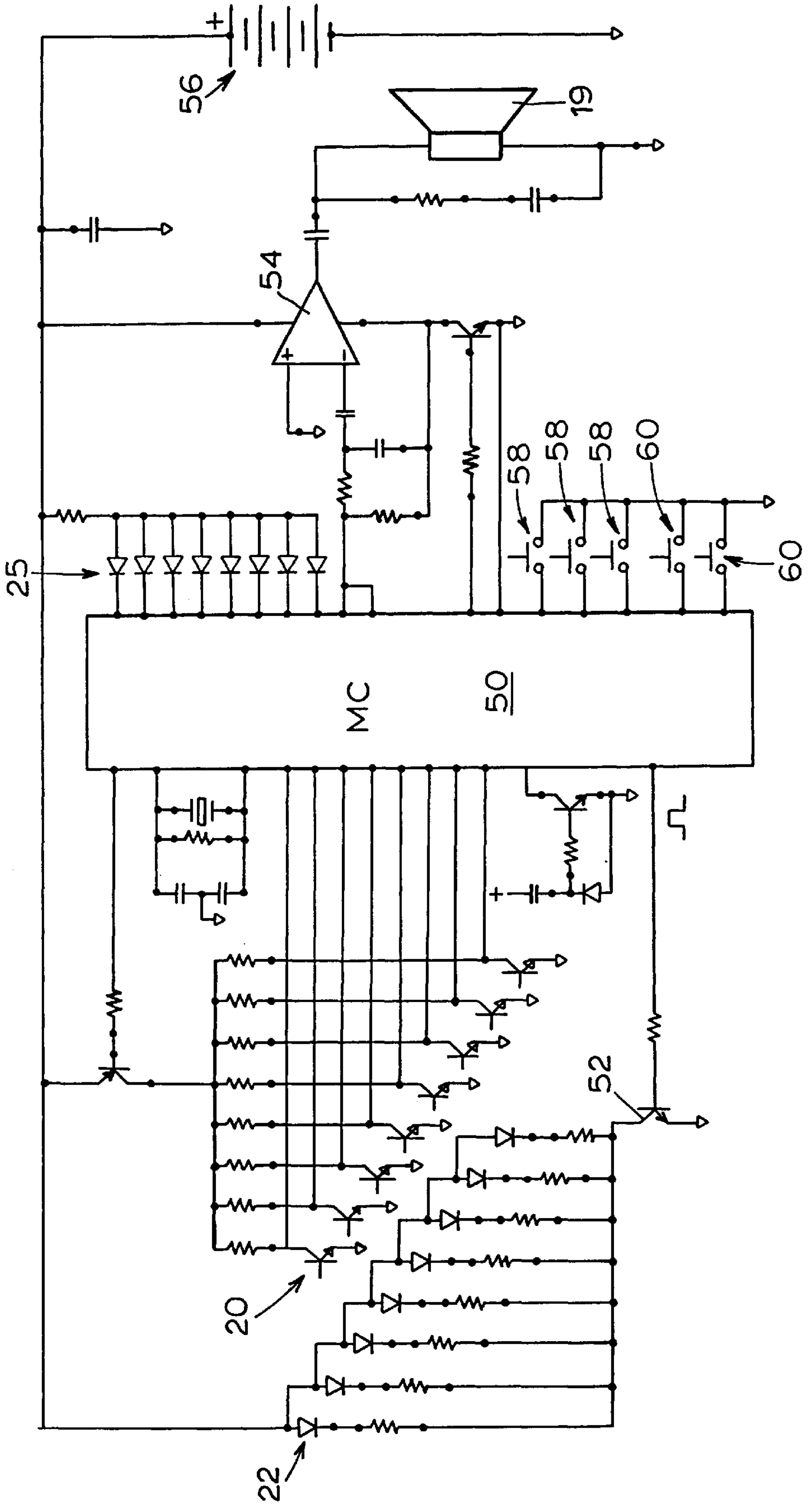
FIG. 3 is a circuit diagram of the electronics of the musical toy of FIG. 1.

A circuit diagram of the electronics of the musical toy 10 is shown in FIG. 3. The electronics, which are mounted to a printed circuit board (not shown) disposed in the interior of the base member 12, include a microcontroller 50 which periodically reads the status of each of the photodetectors 20 to determine if one of the radiation beams has been interrupted and which may selectively illuminate any of the LEDs 25 of the star lights 23. The microcontroller 50 may cause the photoemitters 22 to be periodically illuminated or pulsed at a relatively high rate, e.g. 55 Hz, via a switching transistor 52 controlled by the microcontroller 50, or alternatively, the photoemitters 22 may be constantly illuminated.

The loudspeaker 19, which is driven by an amplifier 54, generates audible individual musical notes or entire songs based on a conventional audio synthesizer circuit (not specifically shown) in the microcontroller 50. The musical toy 10, which is powered by a battery 56, may be provided with a power-saving mode of operation in which a portion of the electrical current-consuming components are temporarily shut off under certain conditions, for example, if the child does not generate any input, e.g. interrupt a radiation beam, to the toy 10 after a predetermined period of time.

The toy 10 is provided with three electrical switches 58 which are activated by the mode-select switch 32 and which specify the current one of the three operational modes of the toy 10 described above. The toy 10 may include additional switches 60 useful for other purposes, such as volume control.

The microcontroller 50 incorporates a number of conventional components (not individually shown), including a microprocessor, a random-access memory (RAM), a read-only memory (ROM), an audio synthesizer circuit, and an input/output (I/O) circuit, all of which are interconnected via an address/data bus. The operation of the musical toy 10 is controlled by a computer program stored in the ROM and executed by the microprocessor.

Figure 4A:
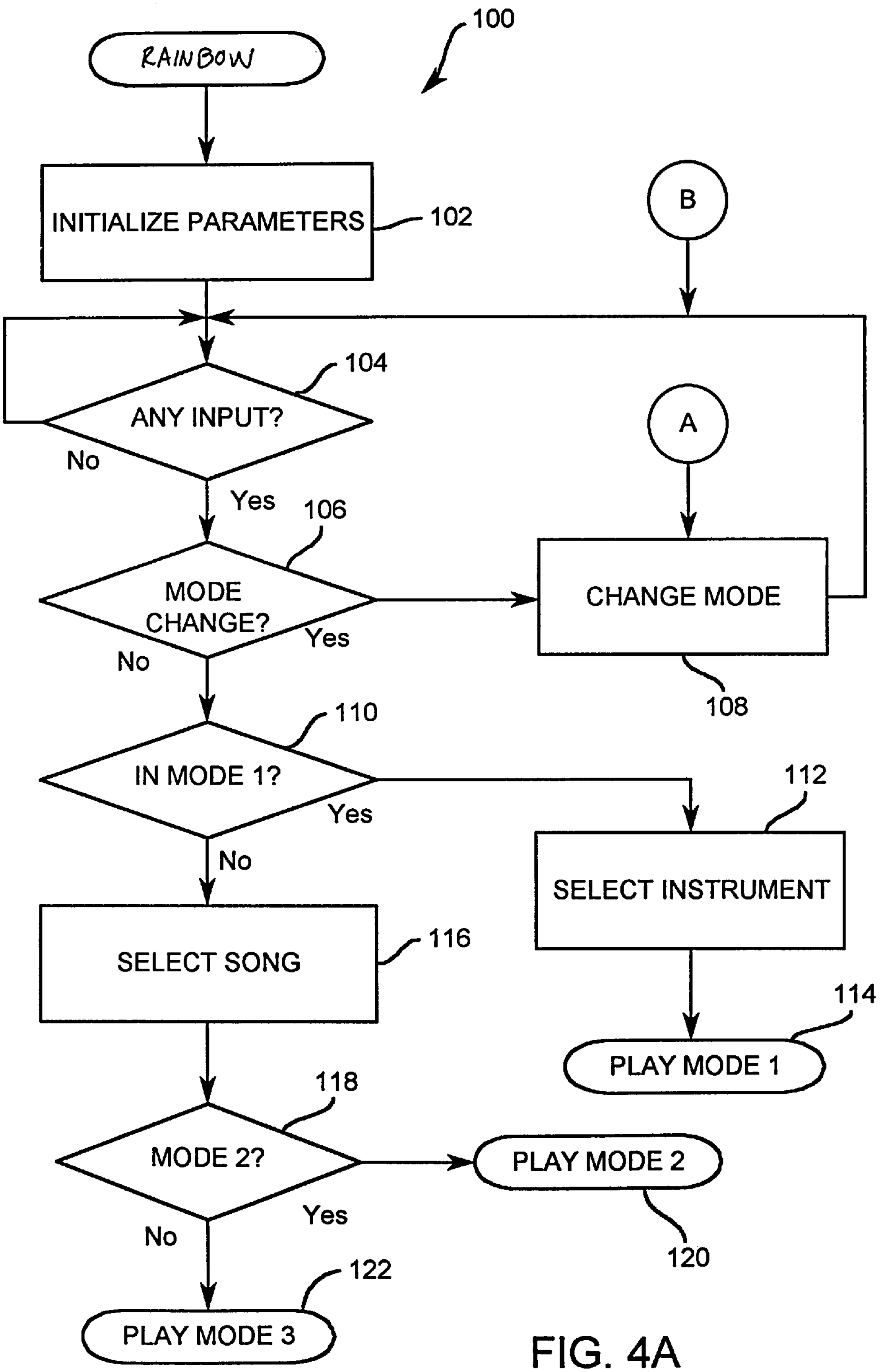
FIGS. 4A–4D illustrate a flowchart of a computer program which controls the operation of the musical toy of FIG. 1.

A flowchart of the computer program is illustrated in FIGS. 4A–4D. Referring to FIG. 4A, the computer program includes a main routine 100 which is performed when the power switch (not shown) of the musical toy 10 is turned on. At step 102, a number of parameters are initialized, and the musical notes to be generated by the loudspeaker 19 are preselected to correspond to a predetermined type of musical instrument.

At step 104, the program waits for the child to make an input. This input may take the form of an interruption of one of the radiation beams or a changing of the position of the mode-select switch 32. Upon detection of an input, the program branches to step 106, where it is determined whether the input was in the form of a change of position of the mode-select switch 32. If so, the program branches to step 108 where the current mode (as stored in the RAM) is changed to correspond to the new mode. The program then branches back to step 104 where it waits for additional input.

At step 106, if the input was not a mode change, meaning that the input was the interruption of one of the radiation beams, then the program branches to step 110. At step 110, if the current mode is Mode 1 (the first operating mode described above), the program branches to step 112 where the musical instrument designated by the instrument designator 30 disposed adjacent the interrupted radiation beam is selected, after which all musical notes generated by the speaker 19 will correspond to that selected musical instrument. The program then branches to a play routine 114 for Mode 1.

If the current mode was not Mode 1 as determined at step 110, meaning the current mode is either Mode 2 or Mode 3 (the second or third operating modes, respectively, described above), the program branches to step 116 where the song designated by the song designator 28 disposed adjacent the interrupted radiation beam is selected. At step 118, if the current mode is Mode 2, the program branches to a play routine 120 for Mode 2. If not, the program branches to a play routine 122 for Mode 3.

Figure 4B:
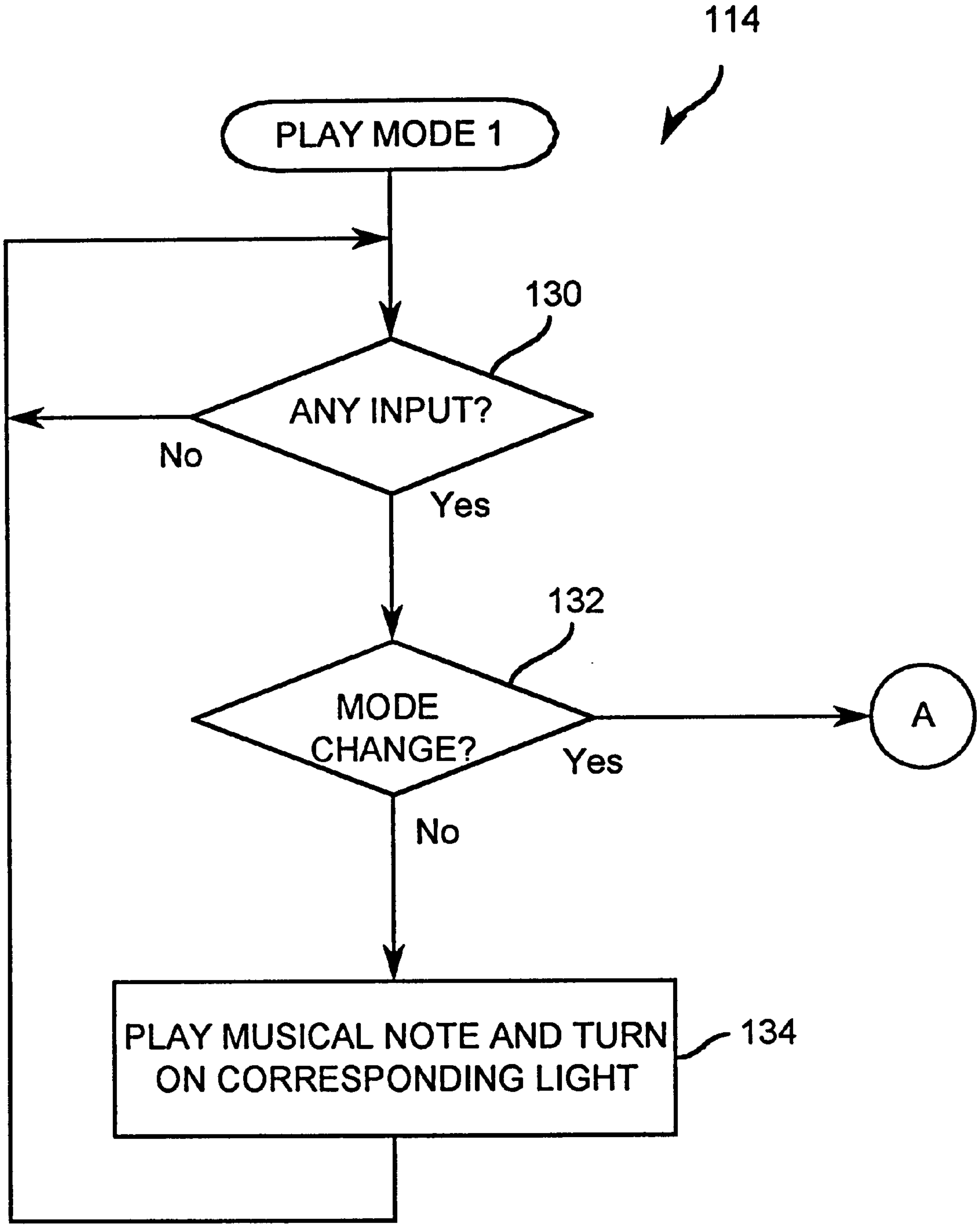

FIG. 4B is a flowchart of the play routine 114 for Mode 1. Referring to FIG. 4B, at step 130, the program waits for input from the child. Upon receiving an input (either an interruption of one of the radiation beams or a positional change of the mode-select switch 32), the program branches to step 132. At step 132, if the input was a mode change, the program branches back to step 108 of FIG. 4A where the mode is changed. If the input was not a mode change, meaning that one of the radiation beams was interrupted, the program branches to step 134 where the musical note associated with the interrupted radiation beam is generated by the speaker 19 and where the star light 23 associated with the interrupted radiation beam is illuminated. The program then branches back to step 130 where it waits for the next input. If the child does not make any input in Mode 1 within a predetermined period of time, the program may branch back to step 104 of FIG. 4A and transition to a power-saving sleep mode in which it remains until another input is made at step 104 of FIG. 4A.

Figure 4C:
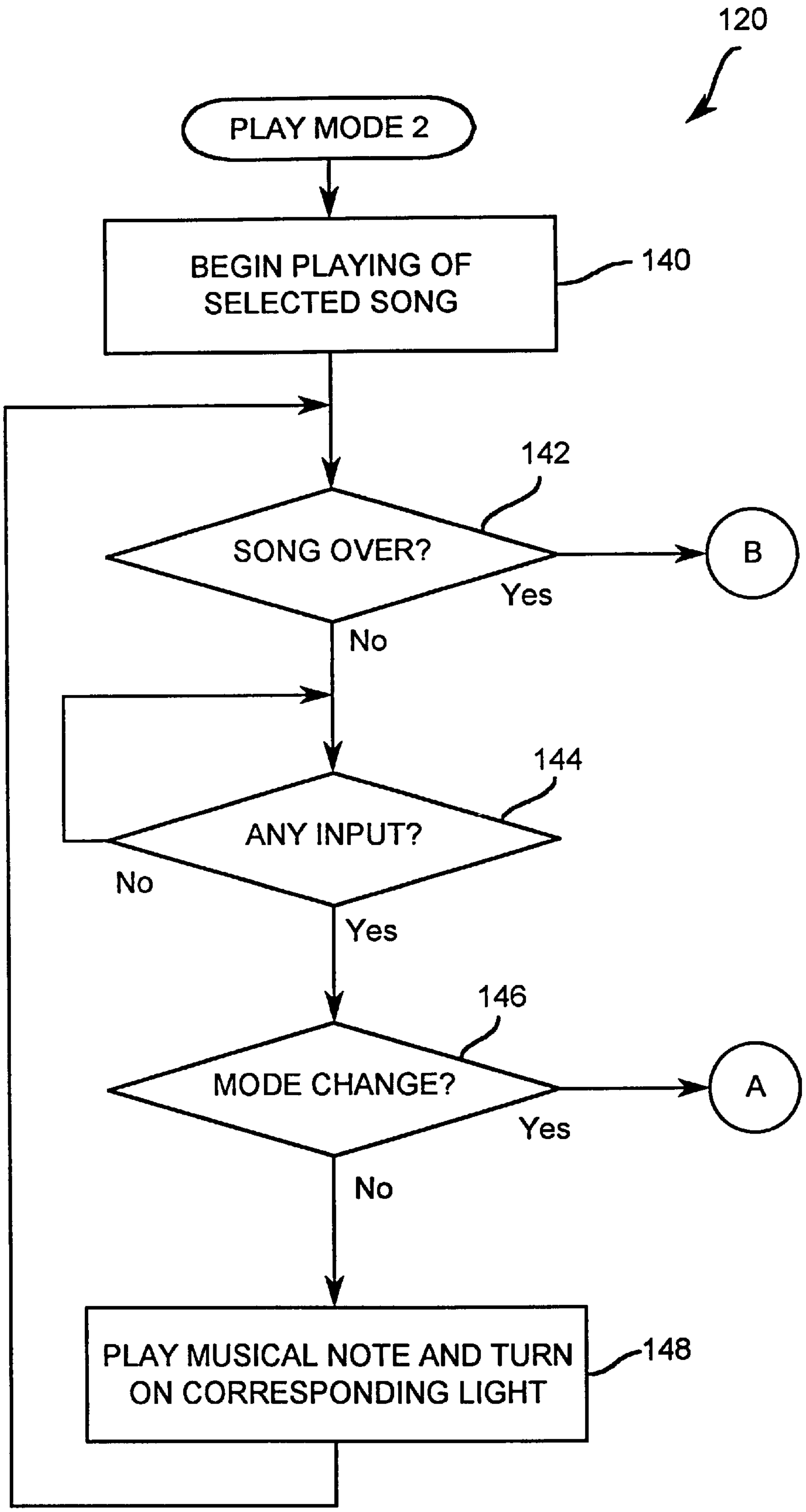

FIG. 4C is a flowchart of the play routine 120 for Mode 2. Referring to FIG. 4C, at step 140 the musical toy 10 begins playing the song selected at step 116 of FIG. 4A. At step 142, if the song has not finished playing, the program branches to step 144, where it waits for input from the child. Upon receiving an input, the program branches to step 146.

At step 146, if the input was a mode change, the program branches back to step 108 of FIG. 4A where the mode is changed. If the input was not a mode change, meaning that one of the radiation beams was interrupted, the program branches to step 148 where the musical note associated with the interrupted radiation beam is generated by the speaker 19 and where the star light 23 associated with the interrupted radiation beam is illuminated.

Figure 4D:
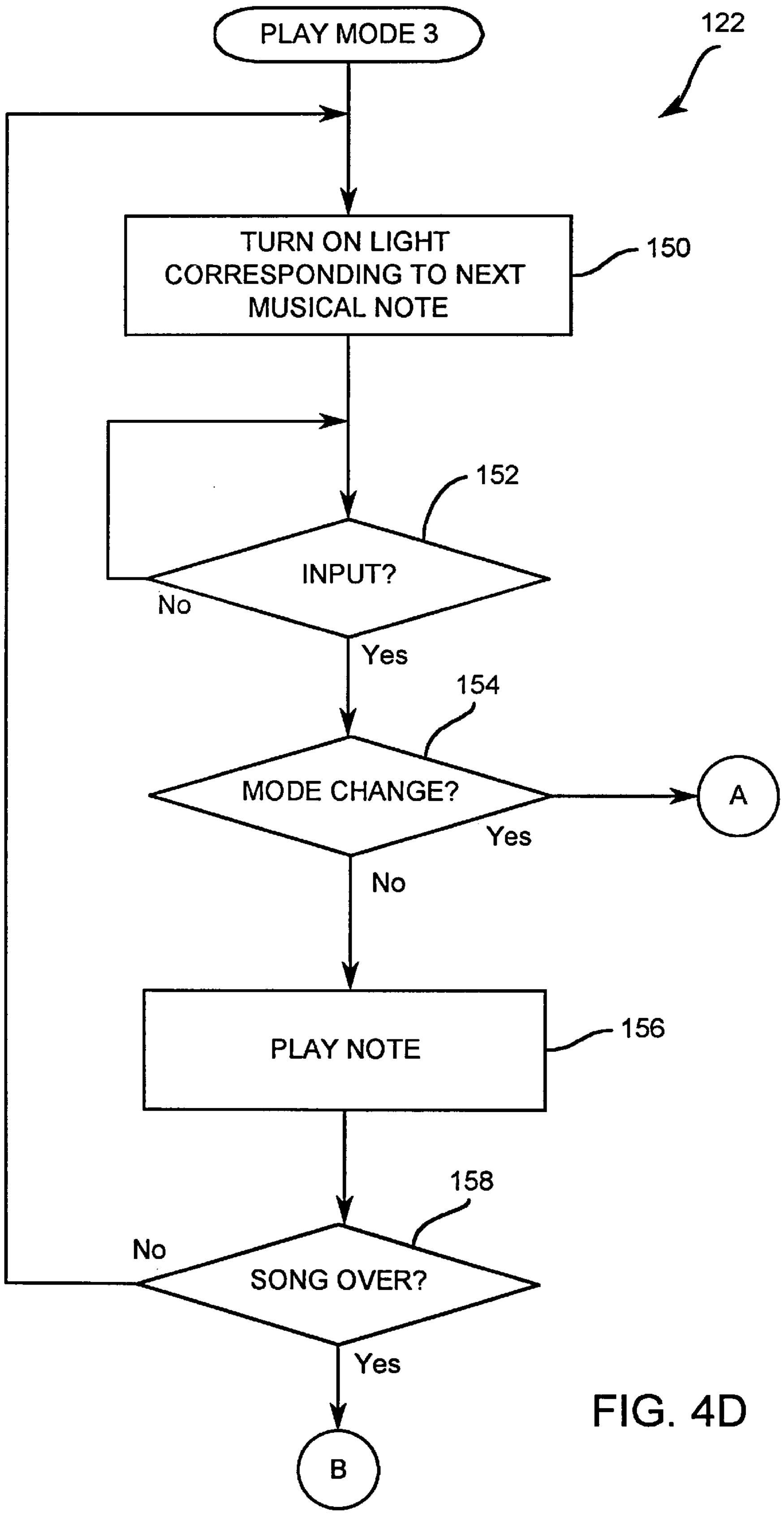

FIG. 4D is a flowchart of the play routine 122 for Mode 3. Referring to FIG. 4D, at step 150 the musical toy 10 turns on the light 23 which corresponds to the first (or next) musical note in the song to be played (which song was selected at step at step 116 of FIG. 4A). At step 152, the program waits for input from the child. Upon receiving an input, the program branches to step 154. At step 154, if the input was a mode change, the program branches back to step 108 of FIG. 4A where the mode is changed. If the input was not a mode change, the program branches to step 156 where the next musical note, i.e. the musical note associated with the light 23 turned on during step 150, is generated by the speaker 19. The program then branches to step 158, where it determines if the song is over. If the song is not over, the program branches back to step 150, where the light 23 for the next musical note in the song is illuminated. If the song is over, the program branches back to step 104 of FIG. 4A.

It should be noted that, in the operation described above, the musical toy 10 will play the note at step 156 regardless of which radiation beam is interrupted by the child. Depending on the age and/or skill level of the child, the toy 10 may alternatively be designed to play the note at step 156 only if the child interrupts the radiation beam corresponding to the light 23 illuminated at step 150, since this requirement will more readily teach the child how to play the song.

In addition to the musical notes played during the repeated performance of step 156, the musical toy 10 can play background music.

Second Embodiment

Figure 5:
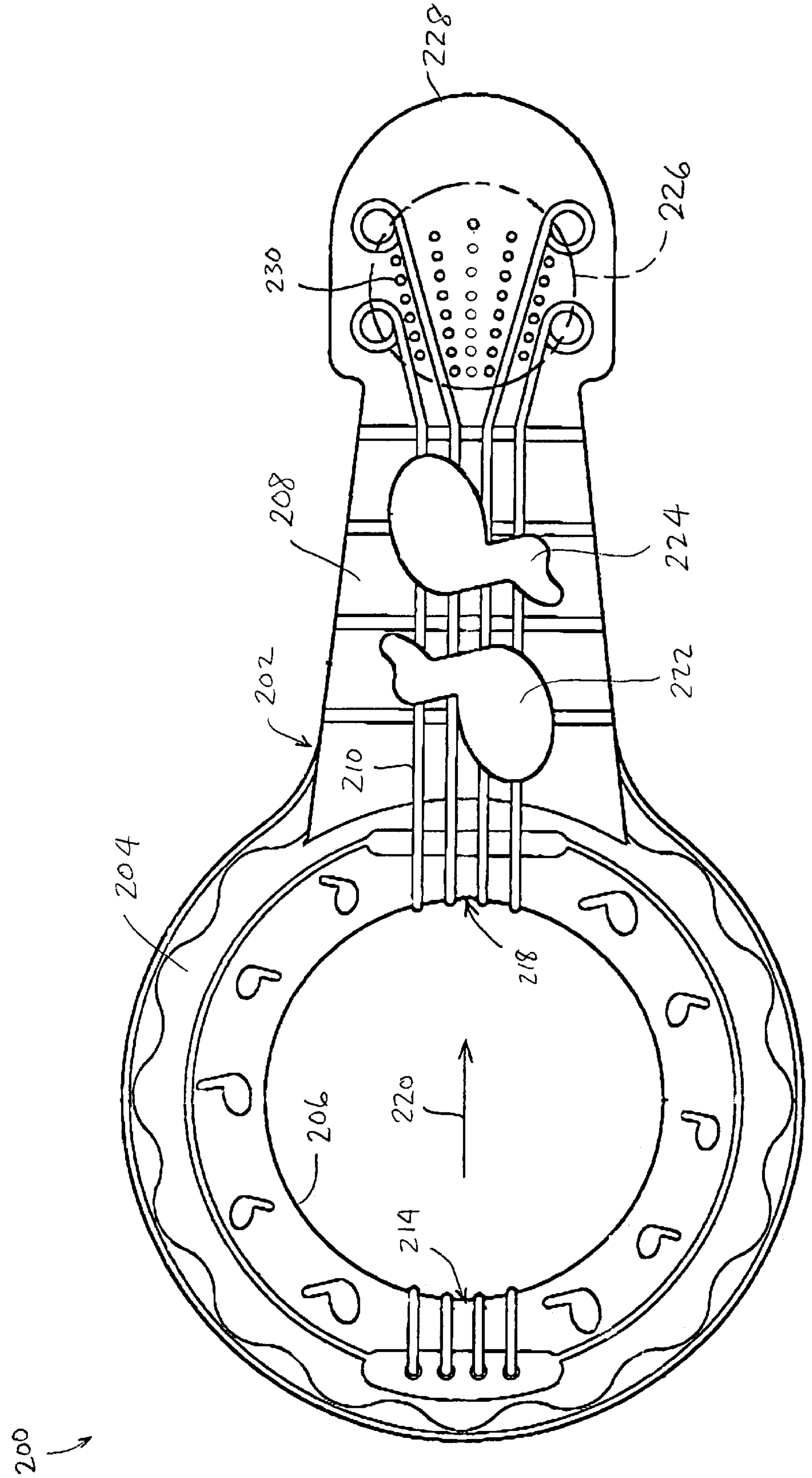
FIG. 5 is a side view of a second embodiment of a musical toy in accordance with the invention.

A second embodiment of a musical toy 200 in accordance with the invention is shown in FIG. 5. The musical toy 200 is composed of a frame member 202 shaped like a banjo and having a circular portion 204 with a substantially unobstructed circular aperture 206 formed therein and a substantially straight portion 208 connected to the circular portion 204. The aperture 206 may be of sufficient size to accommodate the insertion of a child's hand, e.g. four to nine inches in diameter. The frame member 202 may be formed of any suitable material, such as injection-molded plastic. Although the musical toy 200 is shaped like a banjo, it could be shaped like other portable stringed musical instruments, such as a guitar.

The musical toy 200 has a plurality of decorative strings 210, which may be formed of plastic. A photoemitter 212 (shown in FIG. 6) is supported by the circular frame portion 204 at a location designed 214, and a photodetector 216 (shown in FIG. 6) is supported by the circular frame portion 204 at a location designated 218.

When the toy 200 is turned on, the photoemitter 212 generates a single beam of radiation in a direction, indicated by an arrow 220, parallel to the decorative strings 210. Since the radiation beam is capable of being detected by the photodetector 216, the photodetector 216 is capable of detecting when the radiation beam is blocked or interrupted, such as by passing a finger or object between the photoemitter 212 and the photodetector 216. The photoemitter 212 may be a conventional light-emitting diode (LED), and the photodetector 20 may be a conventional phototransistor.

A song-select pushbutton 222 and an instrument-select pushbutton 224, each being in the shape of a musical note, are disposed on the straight frame portion 208. As described below, the song-select pushbutton 222 may be used to select one of a number of musical songs to be played, and the instrument-select pushbutton 224 may be used to select a particular musical instrument in which a song is to be played. A loudspeaker 226 is disposed in the interior of an end portion 228 of the straight frame portion 208. A plurality of small holes 230 are formed in the end 228 of the toy 200 to allow the sounds generated by the loudspeaker 226 to be heard through the frame member 202.

Figure 6:
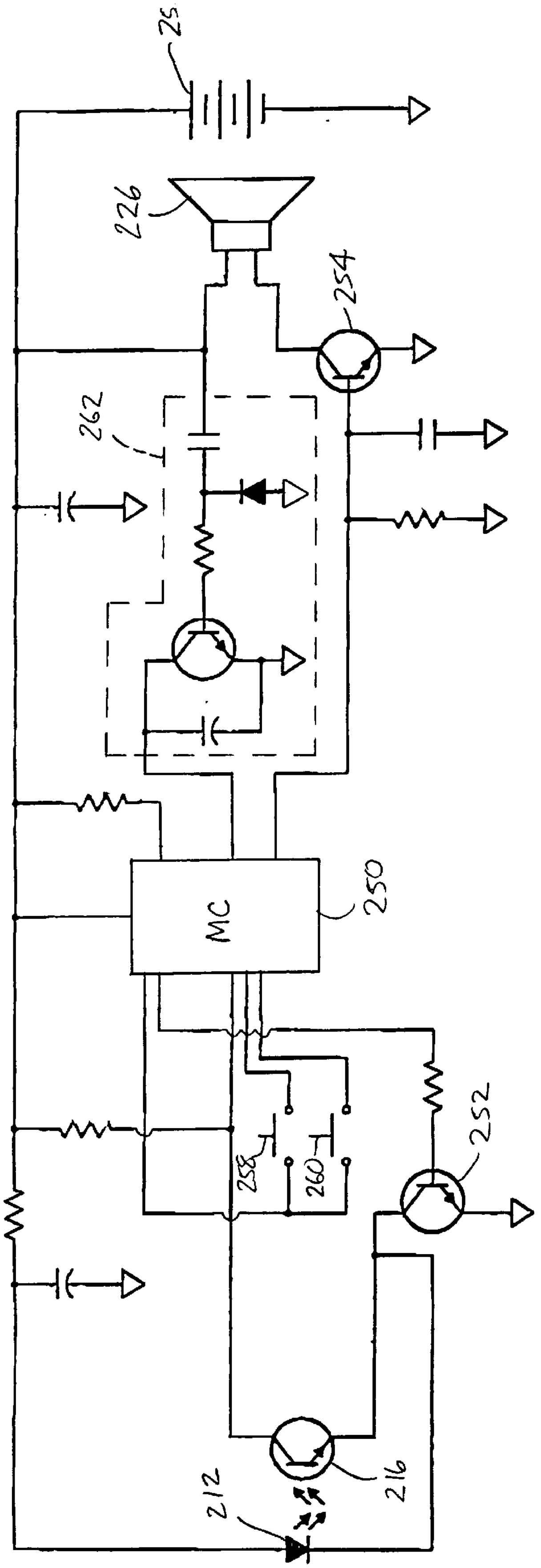
FIG. 6 is a circuit diagram of the electronics of the musical toy of FIG. 5.

A circuit diagram of the electronics of the musical toy 200 is shown in FIG. 6. The electronics, which are mounted to a printed circuit board (not shown) disposed in the interior of the frame member 202, include a microcontroller 250 which periodically reads the status of the photodetector 216 to determine if the radiation beam has been interrupted. The microcontroller 250 may cause the photoemitter 212 to be periodically illuminated or pulsed at a relatively high rate, e.g. 55 Hz, via a switching transistor 252 controlled by the microcontroller 250, or alternatively, the photoemitter 212 may be constantly illuminated.

The loudspeaker 226, which is driven by an amplifier 254, generates audible sets of musical notes or song portions based on a conventional audio synthesizer circuit (not specifically shown) in the microcontroller 250. The audio synthesizer circuit stores a plurality, such as eight, of background portions of predetermined musical songs. The audio synthesizer also generates sounds corresponding to different musical notes played by each of a number of different musical instruments.

To play a song, the background portion of the selected song is combined with the sounds corresponding to the musical notes generated by the selected instrument for that song. Thus, by combining the background portion of each song with the musical notes generated by the different musical instruments, a different version of each song can be played, each version corresponding to a different musical instrument. For example, each musical song can be played in a first version that sounds like it is being played by a guitar, a second version that sounds like it is being played by a banjo, a third version for a third musical instrument, etc.

The musical toy 200, which is powered by a battery 256, may be provided with a power-saving mode of operation in which a portion of the electrical current-consuming components are temporarily shut off under certain conditions, for example, if the child does not generate any input, e.g. interrupt a radiation beam, to the toy 200 after a predetermined period of time.

The toy 200 is provided with an electrical switch 258 which is activated by the song-select pushbutton 222 and an electrical switch 260 which is activated by the instrument-select pushbutton 224. The toy 200 may include additional switches (not shown) useful for other purposes, such as volume control. The toy 200 has a reset circuit 262 that automatically resets the microcontroller 250 upon interruption of battery power for a predetermined period of time.

The microcontroller 250, which may be a single-chip microcontroller, incorporates a number of conventional circuits (not individually shown), including a microprocessor, a random-access memory (RAM), a read-only memory (ROM), an audio synthesizer circuit, and an input/output (I/O) circuit, all of which are interconnected via an address/data bus. The operation of the musical toy 200 is controlled by a computer program stored in the ROM and executed by the microprocessor.

Figure 7:
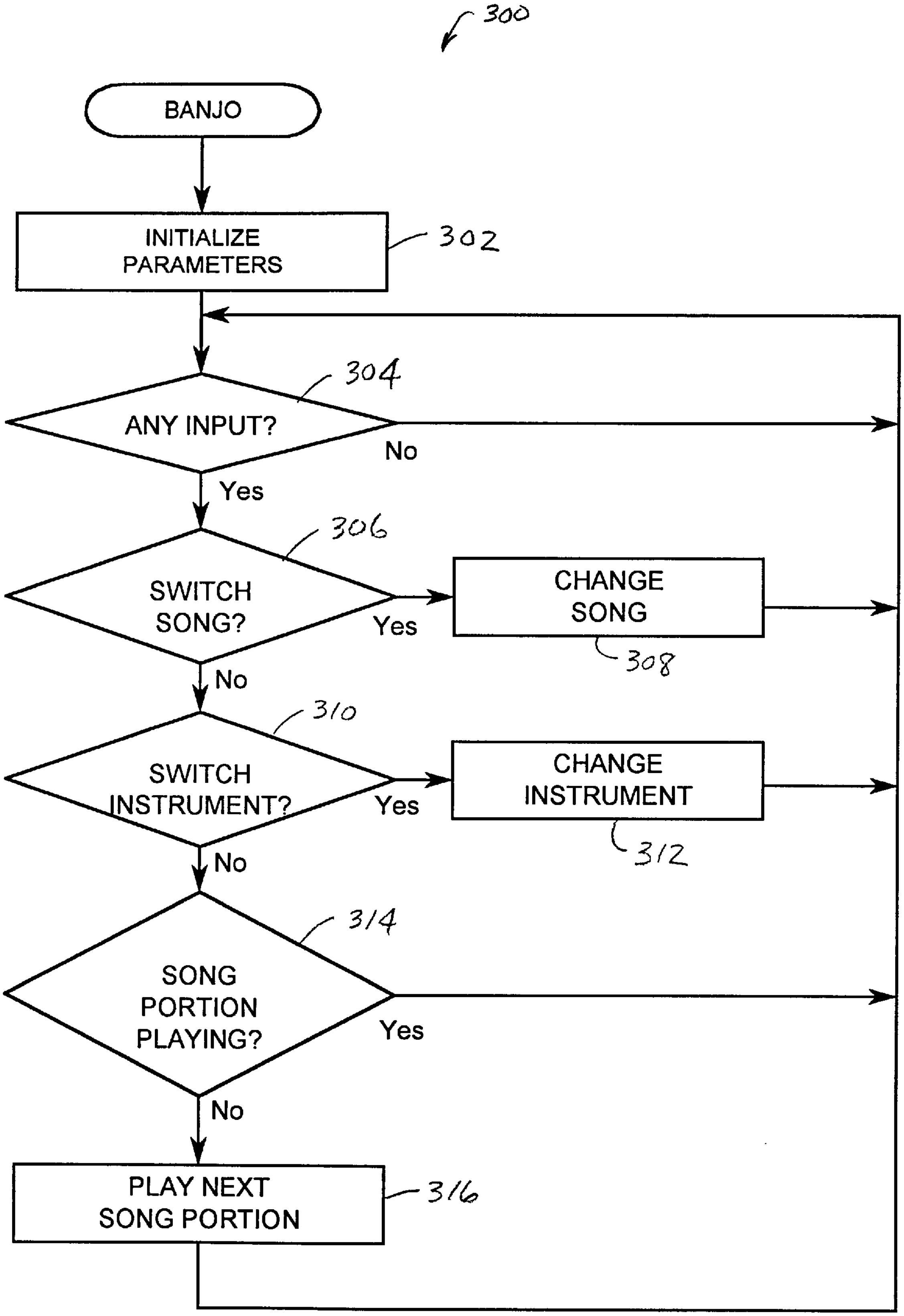
FIG. 7 illustrate as flowchart of a computer program which controls the operation of the musical toy of FIG. 5.

A flowchart of the computer program executed by the microcontroller 250 is illustrated in FIG. 7. Referring to FIG. 7, the computer program includes a banjo routine 300 which is performed when the power switch (not shown) of the musical toy 200 is turned on. At step 302, a number of parameters are initialized, and the musical song portions to be generated by the loudspeaker 226 are preselected to correspond to a predetermined type of musical instrument and to a predetermined song.

At step 304, the program waits for the child to make an input. This input may take the form of an interruption of the radiation beam as detected by the photodetector 216, pressing of the song-select pushbutton 222, or pressing of the instrument-select pushbutton 224.

Upon detection of an input, the program branches to step 306, where it is determined whether the input was caused by pressing of the song-select pushbutton 222 (sensed by the microcontroller 250 as the closing of the switch 258). If the child pressed the song-select button 222, the program branches to step 308 where the current song is changed. The songs could be stored so that each song is played in a predetermined order and so that each pressing of the song-select pushbutton 222 causes the next song in the predetermined order to be played. The program then branches back to step 304 where it waits for additional input.

If the input was not a switch-song request as determined at step 306, the program branches to step 310, where it is determined whether the input was caused by pressing of the instrument-select pushbutton 224 (sensed by the microcontroller 250 as the closing of the switch 260). If the child pressed the instrument-select button 224, the program branches to step 312 where the musical instrument sound which is being combined with the background portion of the current song, as described above, is changed. The instruments in which the songs are played could also be arranged in a predetermined order so that each pressing of the instrument-select pushbutton 224 causes the current song to be played in accordance with the next musical instrument in the predetermined order. The program then branches back to step 304 where it waits for additional input.

If the input was not a switch-instrument request as determined at step 310, the input detected at step 304 was caused by an interruption of the radiation beam. In that case, the program branches to step 314 where it determines whether a portion of a musical song is currently playing (which would have been initiated by a previous interruption of the radiation beam). This condition could be detected in various ways. For example, it could be detected by detecting the occurrence of an end-of-phrase byte which is disposed at the end of each prerecorded song portion stored in memory to signal the end of that song portion.

If a song portion is currently being played as determined at step 314, the new interruption of the radiation beam is ignored, and the program branches back to step 304 where it waits for additional input. If a song portion is not currently being played, the next song portion of the current song is played by the loudspeaker 228 at step 316, after which the program branches back to step 304.

In accordance with the operation described above, each successive interruption of the radiation beam will cause a predetermined portion of a selected musical song to be played, and repeated interruption of the radiation beam will cause temporally successive song portions to be played. Each of the song portions could be, for example, four to eight musical notes in duration. If the radiation beam is continuously interrupted, the successive song portions will be played continuously so that the song will be played in a continuous, uninterrupted manner.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A musical toy, comprising:

a frame member having a substantially unobstructed aperture disposed therein;

a photoemitter for generating a radiation beam across said aperture;

a photodetector positioned to receive said radiation beam;

audio generation means for generating a plurality of temporally successive portions of each of a plurality of predetermined musical songs;

a musical song selector for selecting one of said predetermined musical songs; and play means for causing said audio generation means to generate said temporally successive musical song portions of said one predetermined musical song in response to interruption of said radiation beam to cause said one predetermined musical song to be played.

2. A musical toy as defined in claim 1 wherein said frame member comprises a first portion and a second portion, said aperture being formed in said first portion of said frame member and said second portion of said frame member being substantially linear, so that said frame member has an overall shape in the form of a portable stringed musical instrument.

3. A musical toy as defined in claim 1 wherein said aperture is formed in a circular portion of said frame member and wherein said frame member includes a substantially linear portion connected to said circular portion so that said frame member has an overall shape in the form of a banjo.

4. A musical toy as defined in claim 1 wherein said play means comprises means for causing said audio generation means to continuously generate said temporally successive musical song portions of said one predetermined musical song in response to continuous interruption of said radiation beam.

5. A musical toy as defined in claim 1, wherein said audio generation means comprises means for generating a first version of one of said predetermined musical songs that is played in accordance with a first musical instrument and a second version of said one predetermined musical song that is played in accordance with a second musical instrument different than said first musical instrument, wherein said musical toy additionally comprises a musical instrument selector for selecting one of said versions of said one predetermined musical song, and wherein said play means comprises means for causing said audio generation means to generate temporally successive musical song portions of said one version of said one predetermined musical song in response to interruption of said radiation beam to cause said one version of said one predetermined musical song to be played.

6. A musical toy, comprising:

a base member;

a second member connected to said base member so as to form a substantially unobstructed space between said second member and said base member;

emitter means adapted to generate a plurality of radiation beams between said base member and said second member;

a plurality of photodetectors, each of said photodetectors positioned to receive a respective one of said radiation beams;

a plurality of musical song designators, each of said musical song designators being associated with a different one of said radiation beams and designating a respective one of a plurality of different musical songs; and an audio generator adapted to generate one of said musical songs in response to an interruption of said radiation beam associated with said musical song designator that designates said one musical song.

7. A musical toy as defined in claim 6 wherein said base member is disposed in a generally horizontal plane and wherein said second member comprises a semi-circular shaped rainbow member disposed in a generally vertical plane.

8. A musical toy as defined in claim 6 wherein said musical song designators are disposed on said base member.

9. A musical toy as defined in claim 6 wherein each of said song designators comprises a visual image representing one of said musical songs.

10. A musical toy, comprising:

a structure having a substantially unobstructed aperture disposed therein;

a photoemitter adapted to generate a radiation beam across said aperture;

a photodetector positioned to receive said radiation beam;

a speaker; and a controller operatively coupled to said speaker, said controller having a plurality of temporally successive portions of at least one predetermined musical song stored therein, said controller being programmed to cause said speaker to play one of said temporally successive musical song portions of said predetermined musical song in response to each interruption of said radiation beam;

wherein repeated interruption of said radiation beam causes each successive musical song portion to be played.

11. A musical toy as defined in claim 10 wherein said structure comprises a first portion and a second portion, said aperture being formed in said first portion of said structure and said second portion of said structure being substantially linear, so that said structure has an overall shape in the form of a portable stringed musical instrument.

12. A musical toy as defined in claim 10 wherein said aperture is formed in a circular portion of said structure and wherein said structure includes a substantially linear portion connected to said circular portion so that said structure has an overall shape in the form of a banjo.

13. A musical toy as defined in claim 10 wherein said controller has a plurality of predetermined musical songs stored therein and wherein said musical toy additionally comprises a musical song selector adapted to select one of said predetermined musical songs.

14. A musical toy as defined in claim 10 additionally comprising a musical instrument selector adapted to select one of a plurality of versions of said predetermined musical song.

15. A musical toy, comprising:

a structure having a substantially unobstructed space formed therein;

emitter means adapted to generate a plurality of radiation beams across said unobstructed space;

a plurality of photodetectors, each of said photodetectors positioned to receive a respective one of said radiation beams;

a speaker; and a controller operatively coupled to said speaker, said controller having a plurality of temporally successive portions of at least one predetermined musical song stored therein, said controller being programmed to cause said speaker to play one of said temporally successive musical song portions of said predetermined musical song in response to each interruption of one of said radiation beams;

wherein repeated interruption of said radiation beam causes each successive musical song portion to be played.

16. A musical toy as defined in claim 15 wherein said controller is programmed to operate in a first mode in which said controller causes one of a plurality of musical songs to be played by said speaker and a second mode in which said controller causes musical sounds to be played by said speaker in response to interruption of said radiation beams, said musical toy additionally comprising a switch for selecting said first mode of operation or said second mode of operation.

17. A musical toy as defined in claim 15 wherein said structure comprises a base member disposed in a generally horizontal plane and a semi-circular shaped rainbow member disposed in a generally vertical plane.

18. A musical toy as defined in claim 15 wherein said controller has a plurality of predetermined musical songs stored therein and wherein said musical toy additionally comprises a musical song selector adapted to select one of said predetermined musical songs.

19. A musical toy as defined in claim 15 additionally comprising a musical instrument selector adapted to select one of a plurality of versions of said predetermined musical song.

* * * * *